US012679162B2

(12) United States Patent
Seo et al.

(10) Patent No.: US 12,679,162 B2
(45) Date of Patent: Jul. 14, 2026

(54) MOVABLE OBJECT INCLUDING WHEEL AND METHOD OF OPERATING THE SAME

(71) Applicants: Hyundai Motor Company, Seoul (KR); Kia Corporation, Seoul (KR)

(72) Inventors: Eun Ho Seo, Hwaseong-si (KR); Hyeon Sik Shin, Hwaseong-si (KR); Dae Keun Yoon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 19/089,303

(22) Filed: Mar. 25, 2025

(65) Prior Publication Data

US 2026/0084480 A1      Mar. 26, 2026

(30) Foreign Application Priority Data

Sep. 25, 2024    (KR) ........................ 10-2024-0130222

(51) Int. Cl.
B60G 21/02         (2006.01)
(52) U.S. Cl.
CPC ........ B60G 21/023 (2013.01); B60G 2500/30 (2013.01)
(58) Field of Classification Search
CPC ........................... B60G 21/023; B60G 2500/30
See application file for complete search history.

(56) References Cited

U.S. PATENT DOCUMENTS 9,616,922 B2    4/2017  Suzuki
9,963,168 B2    5/2018  Suzuki 11,292,517 B2    4/2022  Yu
11,491,989 B2   11/2022  Ko et al.
11,945,272 B1 *  4/2024  Elie ......................... B60B 21/00
2017/0210419 A1   7/2017  Suzuki
2020/0398892 A1  12/2020  Yu
2021/0061284 A1   3/2021  Ko et al.

FOREIGN PATENT DOCUMENTS

EP        2995532 A1     3/2016
JP        3077006 U      5/2001
JP     2005028971 A   *  2/2005
JP        6055981 B1     1/2017
KR      20140078226 A    6/2014
KR       101914017 B1   11/2018
KR      20210026249 A    3/2021
KR      20220102880 A    7/2022

OTHER PUBLICATIONS

JP2005028971A Machine English Translation (Year: 2005).*

* cited by examiner

*Primary Examiner* — Jason D Shanske
*Assistant Examiner* — Matthew James O'Neill
(74) *Attorney, Agent, or Firm* — Slater Matsil, LLP

(57)         ABSTRACT

In a method of operating a movable object, in which the movable object includes two or more wheels at least spaced apart from one another in a forward/rearward direction, and two or more eccentric drive parts are each respectively configured to connect a wheel and the body part, the two or more eccentric drive parts can be controlled so that an angle defined between the body part and a ground surface is minimized in a range in which the second side is positioned within the rotatable angle by which the second side is rotatable about the first side.

20 Claims, 6 Drawing Sheets

MOVABLE OBJECT INCLUDING WHEEL AND METHOD OF OPERATING THE SAME

CROSS-REFERENCE TO RELATED APPLICATIONS

This application claims priority to and the benefit of Korean Patent Application No. 10-2024-0130222 filed in the Korean Intellectual Property Office on Sep. 25, 2024, the entire contents of which are incorporated herein by reference.

TECHNICAL FIELD

The present disclosure relates to a movable object including wheels and a method of operating the same.

BACKGROUND

For an eccentric drive device configured to change a relative position between a wheel and a mobility vehicle body provided in a mobility vehicle, the mobility vehicle may advantageously operate in a state in which a motion of the mobility vehicle body is minimized on non-flat terrain by operating the eccentric drive device.

With the increasing demand for mobility vehicles, there is also a growing need for configurations that efficiently control the mobility vehicles to meet the purposes thereof. For example, in case that the mobility vehicle is used to transport items, the mobility vehicle body, onto which the items are loaded, needs to travel while maintaining a state in which the mobility vehicle is positioned as parallelly as possible with respect to a ground surface regardless of a state of the ground surface.

SUMMARY

An embodiment of the present disclosure can allow a mobility vehicle to travel while maintaining a state in which a mobility vehicle body, which constitutes a body of the mobility vehicle, can be positioned as parallelly as possible with respect to a ground surface regardless of a state of the ground surface.

To achieve the above-mentioned advantages, an embodiment of the present disclosure can provide a movable object including: a body part; wheels provided at one side of the body part; and eccentric drive parts, each configured to connect the wheel and the body part and configured to change a relative position between the wheel and the body part, in which the eccentric drive part can include a connection member having a first side rotatably coupled to the wheel, and a second side rotatably coupled to the body part, and in which the eccentric drive part can operate so that a rotatable angle by which the second side is rotatable about the first side can be restricted within a predetermined or selected range.

The eccentric drive part may operate so that the rotatable angle by which the second side is rotatable about the first side is smaller than 180 degrees.

The eccentric drive part may operate so that the second side is always positioned inward of the first side based on a forward/rearward direction of the movable object.

To achieve the above-mentioned advantages, an embodiment of the present disclosure can provide a method of operating the movable object, in which the movable object includes: two or more wheels at least spaced apart from one another in a forward/rearward direction; and two or more eccentric drive parts, each configured to connect the wheel and the body part, and in which the two or more eccentric drive parts can be controlled so that an angle defined between the body part and a ground surface can be minimized in a range in which the second side is positioned within the rotatable angle by which the second side is rotatable about the first side.

The rotatable angle by which the second side is rotatable about the first side of the connection member of each of the eccentric drive parts may be set to be smaller than 180 degrees.

The second side of the connection member of each of the eccentric drive parts may be always positioned outward of the first side based on a forward/rearward direction of the movable object.

A method embodiment of the present disclosure may include: a first target setting operation of setting a target height of the body part with respect to the ground surface and a target angle of the body part with respect to the ground surface; and a first determination operation of determining, based on the first target setting operation, whether the second side of the connection member of each of the eccentric drive parts is positioned within the rotatable angle by which the second side is rotatable about the first side.

In the first determination operation, based on the target setting operation, whether the second side of the connection member of each of the eccentric drive parts is positioned within the rotatable angle by which the second side is rotatable about the first side may be determined in a state in which the body part is kept parallel to the ground surface.

A method embodiment of the present disclosure may further include: a body part posture adjustment operation of adjusting a height of the body part in an upward/downward direction when it is determined in the first determination operation that the second side of each of at least some of the connection members of the eccentric drive parts deviates from the rotatable angle by which the second side is rotatable about the first side.

The body part posture adjustment operation may include lowering the body part to decrease the height of the body part in the upward/downward direction in i) a state in which the body part is parallel to the ground surface and ii) a state in which the second side of the connection member, which is determined as deviating from an upper boundary, is positioned on the upper boundary of the rotatable angle when it is determined in the first determination operation that the connection member, which has the second side determined as deviating from the rotatable angle by which the second side is rotatable about the first side, deviates from the upper boundary of two opposite boundaries in the upward/downward direction of the rotatable angle.

The body part posture adjustment operation may include raising the body part to increase the height of the body part in the upward/downward direction in i) a state in which the body part is parallel to the ground surface and ii) a state in which the second side of the connection member, which is determined as deviating from a lower boundary, is positioned on the lower boundary of the rotatable angle when it is determined in the first determination operation that the connection member, which has the second side determined as deviating from the rotatable angle by which the second side is rotatable about the first side, deviates from the lower boundary of two opposite boundaries in the upward/downward direction of the rotatable angle.

The body part posture adjustment operation may include inclining the body part to adjust the height of the body part while inclining the body part so that the body part has a predetermined or selected angle with respect to the ground surface when it is determined in the first determination operation that the connection members of some of the eccentric drive parts deviate from an upper boundary of two opposite boundaries in the upward/downward direction of the rotatable angle and the connection members of some of the other eccentric drive parts deviate from a lower boundary of the two opposite boundaries in the upward/downward direction of the rotatable angle.

The inclining of the body part may adjust the height of the body part in i) a state in which the second side of the connection member, which is determined as deviating from the upper boundary in the first determination operation, is positioned on the upper boundary of the rotatable angle and ii) a state in which the second side of the connection member, which is determined as deviating from the lower boundary in the first determination operation, is positioned on the lower boundary of the rotatable angle when it is determined in the first determination operation that the connection members of some of the eccentric drive parts deviate from the upper boundary of the two opposite boundaries in the upward/downward direction of the rotatable angle and the connection members of some of the other eccentric drive parts deviate from the lower boundary of the two opposite boundaries in the upward/downward direction of the rotatable angle.

The inclining of the body part may derive an angle defined between the body part and the ground surface from a relationship formula between i) a height of the second side of each of the connection members provided in the movable object, ii) a height of the body part, and iii) the angle defined between the body part and the ground surface and inclines the body part while corresponding to the derived angle.

The inclining of the body part may derive the angle of the body part with respect to the ground surface from the relationship formula by use of a pseudo inverse.

According to an embodiment of the present disclosure, a mobility vehicle may travel while maintaining the state in which the mobility vehicle body, which constitutes the body of the mobility vehicle, can be positioned as parallelly as possible with respect to the ground surface regardless of a state of the ground surface.

DETAILED DESCRIPTION OF ILLUSTRATIVE EMBODIMENTS

Hereinafter, a movable object and a method of operating the same according to example embodiments of the present disclosure will be described with reference to the drawings.

Figure 1:
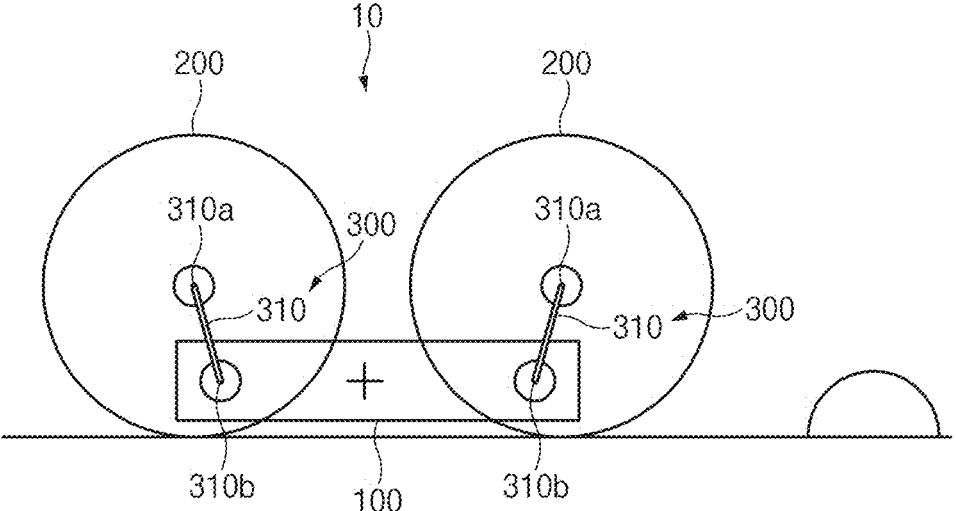
FIG. 1 is a side view illustrating a movable object according to an embodiment of the present disclosure and illustrating a state made before the movable object passes over a low obstacle.
Figure 2:
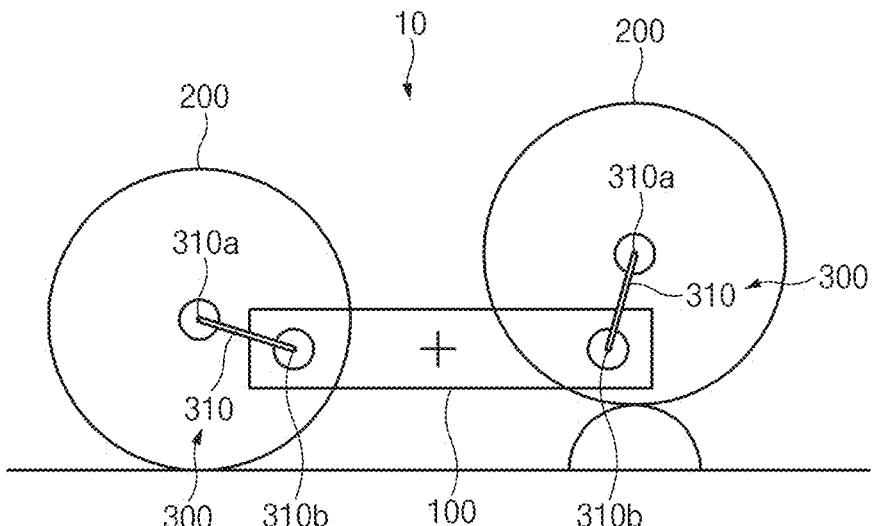
FIG. 2 is a side view illustrating a state in which the movable object in FIG. 1 passes over the low obstacle.
Figure 3:
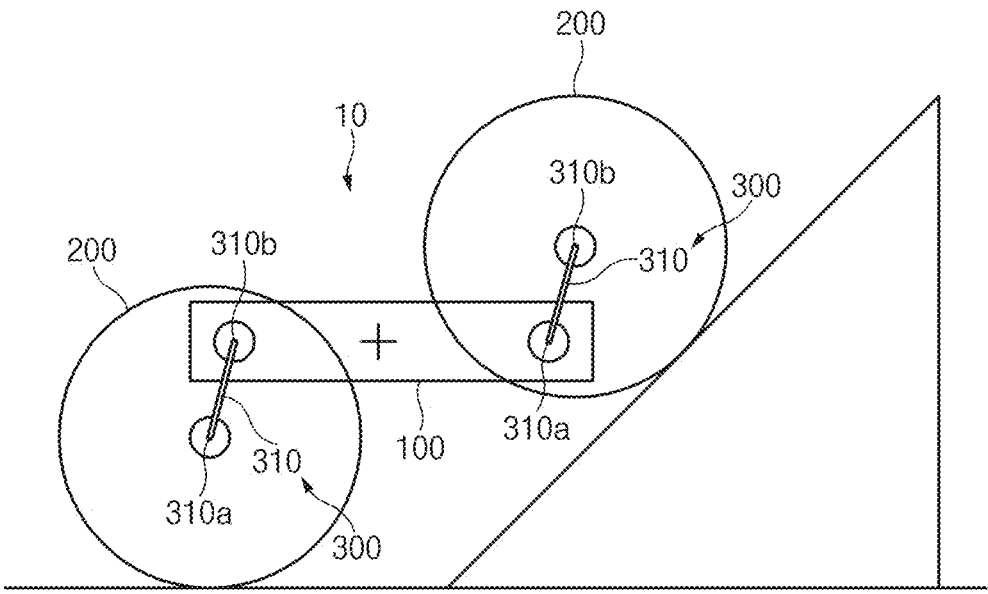
FIG. 3 is a side view illustrating a movable object according to an embodiment of the present disclosure and illustrating an initial state in which the movable object passes over a high obstacle.
Figure 4:
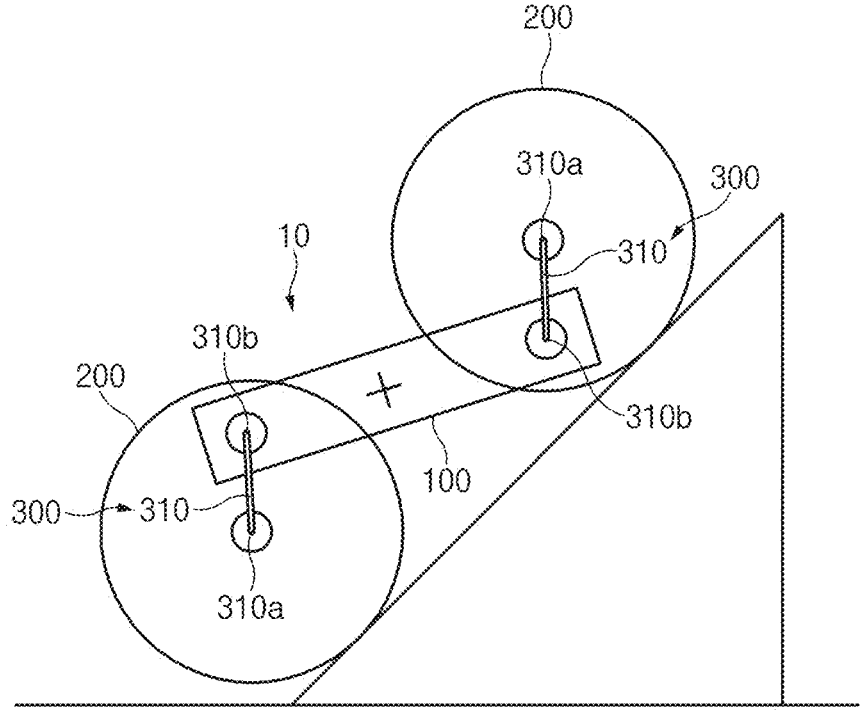
FIG. 4 is a side view illustrating a latter state in which the movable object in FIG. 3 passes over the high obstacle.
Figure 5:
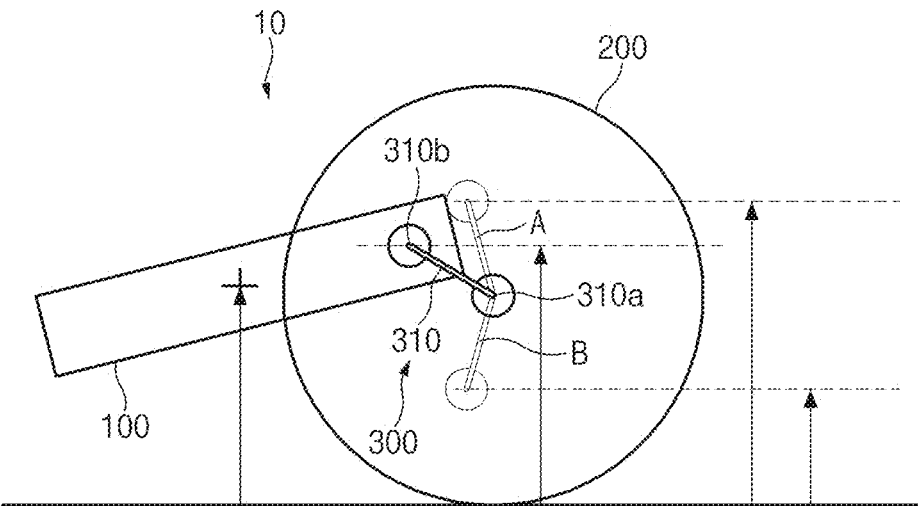
FIG. 5 is an enlarged side view illustrating a state in which a connection member of the movable object according to an embodiment of the present disclosure is coupled to a body part and a wheel.

FIG. 1 is a side view illustrating a movable object according to an embodiment of the present disclosure and illustrating a state made before the movable object passes over a low obstacle. FIG. 2 is a side view illustrating a state in which the movable object in FIG. 1 passes over the low obstacle. FIG. 3 is a side view illustrating a movable object according to an embodiment of the present disclosure and illustrating an initial state in which the movable object passes over a high obstacle. FIG. 4 is a side view illustrating a latter state in which the movable object in FIG. 3 passes over the high obstacle. FIG. 5 is an enlarged side view illustrating a state in which a connection member of the movable object according to an embodiment of the present disclosure is coupled to a body part and a wheel.

A movable object 10 according to an embodiment of the present disclosure may include: a body part 100 configured to define a body of the movable object; wheels 200 provided at one side of the body part 100; and eccentric drive parts 300, each configured to connect a wheel 200 and the body part 100 and configured to change a relative position between the wheel 200 and the body part 100. FIGS. 1 to 5 illustrate example embodiments in which the wheels 200 are respectively provided in front and rear regions of the body part 100, such that the two wheels 200 can be spaced apart from each other in a forward/rearward direction. However, for example, the movable object 10 according to an embodiment of the present disclosure may include four wheels 200 (e.g., two wheels on each side of the body part 100). In such case, the two wheels 200 may be respectively provided at left and right sides of the front region of the body part 100, and the remaining two wheels 200 may be respectively provided at left and right sides of the rear region of the body part 100, for example.

The eccentric drive part 300 may include a connection member 310 having a first side 310a rotatably coupled to the wheel 200, and a second side 310b rotatably coupled to the body part 100. According to an embodiment of the present disclosure, when the second side 310b relatively rotates about the first side 310a, an angle of the connection member 310 with respect to a ground surface may be changed, such that a relative position between the wheel 200 and the body part 100 may be changed.

In such case, according to an embodiment of the present disclosure, the above-mentioned eccentric drive part 300 may operate so that a rotatable angle by which the second side 310b is rotatable about the first side 310a can be restricted within a predetermined or selected range. The above-mentioned predetermined or selected range may be a preset range. That is, according to an embodiment of the present disclosure, the connection member 310 may be configured to not rotate infinitely. For example, the eccentric drive part 300 may operate so that the rotatable angle by which the second side 310b is rotatable about the first side 310a is smaller than 180 degrees, and the second side 310b can be always positioned inward of the first side 310a based on a forward/rearward direction of the movable object 10. This can be to always apply a supporting force of the ground surface to the wheel 200 during an operating process of the eccentric drive part 300 regardless of the relative position of the connection member 310. More specifically, in the case of the connection member 310 connected to the wheel 200 provided in the front region of the body part 100 among the plurality of wheels 200, the second side 310*b* may be always positioned rearward of the first side 310*a*. In the case of the connection member 310 connected to the wheel 200 provided in the rear region of the body part 100 among the plurality of wheels 200, the second side 310*b* may be always positioned forward of the first side 310*a*.

Figure 6:
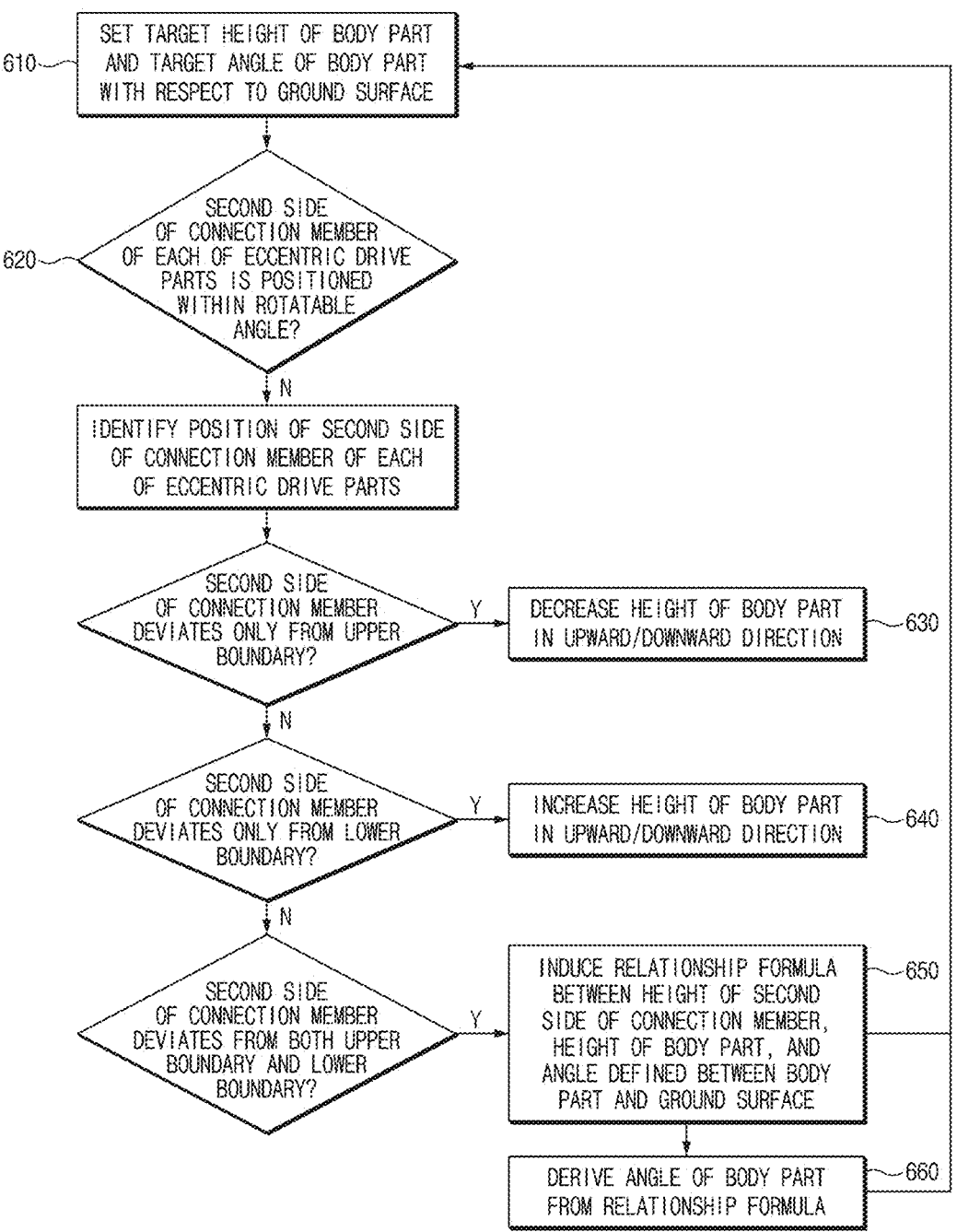
FIG. 6 is a flowchart illustrating a method of operating the movable object according to an embodiment of the present disclosure.

FIG. 6 is a flowchart illustrating a method of operating a movable object according an embodiment of to the present disclosure.

In a method of operating the movable object 10 according to an embodiment of the present disclosure, the movable object 10 may include two or more wheels 200 at least spaced apart from one another in the forward/rearward direction, and two or more eccentric drive parts 300 configured to connect the wheels 200 and the body part 100 (see, e.g., FIGS. 1-5). For example, the movable object 10 may include two wheels provided in the front region of the body part 100, and two wheels provided in the rear region of the body part 100.

In a method of operating the movable object 10 according to an embodiment of the present disclosure, the two or more eccentric drive parts 300 may be controlled so that an angle defined between the body part 100 and the ground surface can be minimized within a range in which the second side 310*b* is positioned within the rotatable angle by which the second side 310*b* is rotatable about the first side 310*a*. In particular, in a method of operating the movable object according to an embodiment of the present disclosure, the rotatable angle by which the second side 310*b* is rotatable about the first side 310*a* of the connection member 310 of the eccentric drive part 300 may be set to be smaller than 180 degrees, and the movable object may be operated so that the second side 310*b* of the connection member 310 of the eccentric drive part 300 can be always positioned inward of the first side 310*a* based on the forward/rearward direction of the movable object 10.

With reference to FIG. 6, the method of operating the movable object according an embodiment of to the present disclosure may include a first target setting operation of setting a target height of the body part 100 with respect to the ground surface and setting a target angle of the body part 100 with respect to the ground surface (operation 610). The above-mentioned first target setting operation may be performed in a case that the movable object meets an obstacle positioned forward of the movable object, and the movable object needs to pass over the obstacle during an operating process of the movable object.

A method of operating the movable object according to an embodiment of the present disclosure may further include a first determination operation of determining, based on the first target setting operation, whether the second side 310*b* of each of the connection members 310 of the eccentric drive parts 300 of the movable object is positioned within the rotatable angle by which the second side 310*b* is rotatable about the first side 310*a*. More specifically, in the first determination operation, whether the second side 310*b* of each of the connection members 310 of the eccentric drive parts 300 is positioned within the rotatable angle by which the second side 310*b* is rotatable about the first side 310*a* may be determined (operation 620), based on the first target setting operation, in a state in which the body part 100 is kept parallel to the ground surface.

A method of operating the movable object according to an embodiment of the present disclosure may further include a body part posture adjustment operation of adjusting a height of the body part 100 in an upward/downward direction (i.e., a relative height with respect to the ground surface) when it is determined in first determination operation that the second side 310*b* of each of at least some of the connection members 310 of the eccentric drive parts 300 deviates from the rotatable angle by which the second side 310*b* is rotatable about the first side 310*a*.

The case, in which the second side 310*b* of the connection member 310 of the eccentric drive part 300 of the movable object 10 deviates from the rotatable angle, may be broadly classified into: i) a case in which the second side 310*b* deviates from an upper boundary A (see FIG. 5) of two opposite boundaries in the upward/downward direction of the rotatable angle, and ii) a case in which the second side 310*b* deviates from a lower boundary B (see FIG. 5) of the two opposite boundaries in the upward/downward direction of the rotatable angle.

In such case, according to an embodiment of the present disclosure, the body part posture adjustment operation may include lowering the body part to decrease the height of the body part 100 in the upward/downward direction (operation 630), and raising the body part to increase the height of the body part 100 in the upward/downward direction (operation 640). More specifically, the body part posture adjustment operation may include the lowering of the body part to decrease the height of the body part 100 in the upward/downward direction (operation 630) in i) a state in which the body part 100 is parallel to the ground surface and ii) a state in which the second side 310*b* of the connection member 310, which can be determined as deviating from the upper boundary A, is positioned on the upper boundary A of the rotatable angle in a case that it is determined in the above-mentioned first determination operation that the connection member 310, which has the second side 310*b* determined as deviating from the rotatable angle by which the second side 310*b* is rotatable about the first side 310*a*, deviates from the upper boundary A of the two opposite boundaries in the upward/downward direction of the rotatable angle.

The body part posture adjustment operation may further include the raising of the body part to increase the height of the body part 100 in the upward/downward direction (operation 640) in i) a state in which the body part 100 is parallel to the ground surface and ii) a state in which the second side 310*b* of the connection member 310, which is determined as deviating from the lower boundary B, is positioned on the lower boundary B of the rotatable angle in case that it is determined in the above-mentioned first determination operation that the connection member 310, which has the second side 310*b* determined as deviating from the rotatable angle by which the second side 310*b* is rotatable about the first side 310*a*, deviates from the lower boundary B of the two opposite boundaries in the upward/downward direction of the rotatable angle.

More specifically, as illustrated in FIG. 1, in a case that an obstacle is present forward of the movable object 10 in a state in which the second side 310*b* of the connection member 310 connected to the wheel 200 provided at the front side of the movable object 10 is positioned in the vicinity of the lower boundary B (see FIG. 5), the wheel 200 provided at the front side can be raised above the obstacle, as illustrated in FIG. 2. In such case, according to an embodiment of the present disclosure, in the above-mentioned first determination operation, the second side 310*b* can be determined as deviating from the lower boundary B (see FIG. 5). Therefore, in the body part posture adjustment operation, the raising of the body part can be performed as described above. In such case, the raising of the body part may be performed by adjusting the position of the second side 310*b* of the connection member 310 connected to the wheel 200 provided at the rear side.

In the above-mentioned first determination operation, in a case that the second sides 310*b* of the plurality of connection members 310 are determined as deviating from the rotatable angle, the second sides 310*b* of some of the connection member 310 may be determined as deviating from the upper boundary A, whereas the second sides 310*b* of some of the other connection members 310 may be determined as deviating from the lower boundary B. In such case, the method may further include inclining the body part 100 so that the body part 100 has a predetermined or selected angle with respect to the ground surface so that the body part 100 according to an embodiment of the present disclosure is not parallel to the ground surface.

More specifically, according to an embodiment of the present disclosure, the body part posture adjustment operation may further include the inclining of the body part to adjust the height of the body part 100 while inclining the body part 100 so that the body part 100 has a predetermined or selected angle with respect to the ground surface in a case that it is determined in the above-mentioned first determination operation that the connection members 310 of some of the eccentric drive parts 300 deviate from the upper boundary A of the two opposite boundaries in the upward/downward direction of the rotatable angle, and the connection members 310 of some of the other eccentric drive parts 300 deviate from the lower boundary B of the two opposite boundaries in the upward/downward direction of the rotatable angle. The inclining of the body part may be performed in a case that the body part 100 cannot pass over the obstacle, which can be disposed forward of the movable object 10, any further in the state in which the body part 100 is kept parallel to the ground surface.

More specifically, the above-mentioned inclining of the body part may adjust the height of the body part 100 in i) a state in which the second side 310*b* of the connection member 310, which is determined as deviating from the upper boundary A in the first determination operation, is positioned on the upper boundary A of the rotatable angle and ii) a state in which the second side 310*b* of the connection member 310, which is determined as deviating from the lower boundary B in the first determination operation, is positioned on the lower boundary B of the rotatable angle in case that it is determined in the above-mentioned first determination operation that the connection members of some of the eccentric drive parts deviate from the upper boundary of the two opposite boundaries in the upward/downward direction of the rotatable angle, and the connection members of some of the other eccentric drive parts deviate from the lower boundary of the two opposite boundaries in the upward/downward direction of the rotatable angle.

More specifically, as illustrated in FIG. 4, the body part 100 can be inclined in a case that the body part 100 needs to pass over the obstacle in a state in which the second side 310*b* of the connection member 310 connected to the wheel 200 provided at the front side of the movable object 10 is positioned on the lower boundary B (see FIG. 5) and the second side 310*b* of the connection member 310 connected to the wheel 200 provided at the rear side of the movable object 10 is positioned on the upper boundary A (see FIG. 5) during the process in which the movable object 10 passes over the obstacle disposed forward of the movable object 10, as illustrated in FIG. 3. That is, according to an embodiment of the present disclosure, it can be that the body part 100 cannot be kept parallel to the ground surface any further in the above-mentioned situation. Even in such case, according to an embodiment of the present disclosure, the movable object may operate so that the angle of the body part 100 with respect to the ground surface can be minimized even in a case that the body part 100 is inclined. That is, based on FIG. 4, according to an embodiment of the present disclosure, in the above-mentioned inclining of the body part, the body part 100 can be inclined in a state in which the second side 310*b* of the connection member 310 connected to the wheel 200 provided at the front side is positioned on the lower boundary B and the second side 310*b* of the connection member 310 connected to the wheel 200 provided at the rear side is positioned on the upper boundary A. Therefore, the body part may be inclined in the state in which the angle defined between the body part 100 and the ground surface is minimized.

The above-mentioned inclining of the body part may derive the angle defined between the body part 100 and the ground surface from a relationship formula between i) a height of the second side 310*b* of each of the connection members 310 provided in the movable object 10, ii) a height of the body part 100, and iii) the angle defined between the body part 100 and the ground surface (operations 650 and 660), and incline the body part 100 while corresponding to the derived angle. For example, the above-mentioned inclining of the body part may derive the angle of the body part 100 with respect to the ground surface from the relationship formula by use of a pseudo inverse.

Example embodiments of the present disclosure has been described with reference to the drawings, but the present disclosure is not necessarily limited thereby. Embodiments of the present disclosure may be carried out in various forms by those skilled in the art, to which the present disclosure pertains, within the technical spirit of the present disclosure and the scopes equivalent to the appended claims.

What is claimed is:

1. A method of operating a movable object that comprises a body part, a plurality of wheels spaced apart from one another in a forward/rearward direction, and a plurality of eccentric drive parts, each eccentric drive part being configured to connect an associated wheel and the body part, wherein each of the eccentric drive parts comprises a connection member having a first side rotatably coupled to the associated wheel and having a second side rotatably coupled to the body part, the method comprising:

controlling the eccentric drive parts to change a relative position between the associated wheel and the body part so that an angle defined between the body part and a ground surface is minimized in a range in which the second side is positioned within a rotatable angle by which the second side is rotatable about the first side, the rotatable angle being restricted within a selected range;

performing a first target setting operation, wherein the first target setting operation comprises setting a target height of the body part with respect to the ground surface and setting a target angle of the body part with respect to the ground surface; and performing a first determination operation of determining, based on the first target setting operation, whether the second side of the connection member of each of the eccentric drive parts is positioned within the rotatable angle by which the second side is rotatable about the first side.

2. The method of claim 1, further comprising setting the rotatable angle by which the second side is rotatable about the first side of the connection member of each of the eccentric drive parts to be smaller than 180 degrees.

3. The method of claim 1, further comprising limiting a position of the second side of the connection member of each of the eccentric drive parts to be always positioned outward of the first side based on the forward/rearward direction of the movable object.

4. The method of claim 1, wherein the first determination operation comprises determining whether the second side of the connection member of each of the eccentric drive parts is positioned within the rotatable angle by which the second side is rotatable about the first side in a state in which the body part is kept parallel to the ground surface.

5. A method of operating a movable object that comprises a body part, a plurality of wheels spaced apart from one another in a forward/rearward direction, and a plurality of eccentric drive parts, each eccentric drive part being configured to connect an associated wheel and the body part, wherein each of the eccentric drive parts comprises a connection member having a first side rotatably coupled to the associated wheel and having a second side rotatably coupled to the body part, the method comprising:

controlling the eccentric drive parts to change a relative position between the associated wheel and the body part so that an angle defined between the body part and a ground surface is minimized in a range in which the second side is positioned within a rotatable angle by which the second side is rotatable about the first side, the rotatable angle being restricted within a selected range;

performing a first target setting operation, wherein the first target setting operation comprises setting a target height of the body part with respect to the ground surface and setting a target angle of the body part with respect to the ground surface; and performing a first determination operation of determining, based on the first target setting operation, whether the second side of the connection member of each of the eccentric drive parts is positioned within the rotatable angle by which the second side is rotatable about the first side; and performing a body part posture adjustment operation of adjusting a height of the body part in an upward/downward direction based on determining in the first determination operation that the second side of each of at least some of the connection members of the eccentric drive parts deviates from the rotatable angle by which the second side is rotatable about the first side.

6. The method of claim 5, wherein the body part posture adjustment operation comprises lowering the body part to decrease the height of the body part in the upward/downward direction in a state in which the body part is parallel to the ground surface and in the state in which the second side of the connection member, which is determined as deviating from an upper boundary, is positioned on the upper boundary of the rotatable angle based on determining in the first determination operation that the connection member, which has the second side determined as deviating from the rotatable angle by which the second side is rotatable about the first side, deviates from the upper boundary of two opposite boundaries in the upward/downward direction of the rotatable angle.

7. The method of claim 5, wherein the body part posture adjustment operation comprises raising the body part to increase the height of the body part in the upward/downward direction in a state in which the body part is parallel to the ground surface and in the state in which the second side of the connection member, which is determined as deviating from a lower boundary, is positioned on the lower boundary of the rotatable angle based on determining in the first determination operation that the connection member, which has the second side determined as deviating from the rotatable angle by which the second side is rotatable about the first side, deviates from the lower boundary of two opposite boundaries in the upward/downward direction of the rotatable angle.

8. The method of claim 5, wherein the body part posture adjustment operation comprises inclining the body part to adjust the height of the body part while inclining the body part so that the body part has a selected body angle with respect to the ground surface based on determining in the first determination operation that the connection members of a first set of the eccentric drive parts deviate from an upper boundary of two opposite boundaries in the upward/downward direction of the rotatable angle and the connection members of a second set of the eccentric drive parts deviate from a lower boundary of the two opposite boundaries in the upward/downward direction of the rotatable angle.

9. The method of claim 8, wherein the inclining of the body part adjusts the height of the body part in a state in which the second side of the connection member, which is determined as deviating from the upper boundary in the first determination operation, is positioned on the upper boundary of the rotatable angle and in the state in which the second side of the connection member, which is determined as deviating from the lower boundary in the first determination operation, is positioned on the lower boundary of the rotatable angle based on determining in the first determination operation that the connection members of a first set of the eccentric drive parts deviate from the upper boundary of the two opposite boundaries in the upward/downward direction of the rotatable angle and the connection members of a second set of the eccentric drive parts deviate from the lower boundary of the two opposite boundaries in the upward/downward direction of the rotatable angle.

10. The method of claim 9, wherein the inclining of the body part derives a derived angle defined between the body part and the ground surface from a relationship formula between a first height of the second side of each of the connection members provided in the movable object, a second height of the body part, and the ground angle defined between the body part and the ground surface and inclines the body part while corresponding to the derived angle.

11. The method of claim 10, wherein the inclining of the body part derives the derived angle of the body part with respect to the ground surface from the relationship formula by use of a pseudo inverse.

12. The method of claim 5, further comprising setting the rotatable angle by which the second side is rotatable about the first side of the connection member of each of the eccentric drive parts to be smaller than 180 degrees.

13. The method of claim 5, further comprising limiting a position of the second side of the connection member of each of the eccentric drive parts to be always positioned outward of the first side based on the forward/rearward direction of the movable object.

14. The method of claim 5, wherein the first determination operation comprises determining whether the second side of the connection member of each of the eccentric drive parts is positioned within the rotatable angle by which the second side is rotatable about the first side in a state in which the body part is kept parallel to the ground surface.

15. A method of operating a movable object that comprises a body part, a plurality of wheels spaced apart from one another in a forward/rearward direction, and a plurality of eccentric drive parts, each eccentric drive part being configured to connect an associated wheel and the body part, wherein each of the eccentric drive parts comprises a connection member having a first side rotatably coupled to the associated wheel and having a second side rotatably coupled to the body part, the method comprising:

controlling the eccentric drive parts to change a relative position between the associated wheel and the body part so that an angle defined between the body part and a ground surface is minimized in a range in which the second side is positioned within a rotatable angle by which the second side is rotatable about the first side, the rotatable angle being restricted within a selected range;

performing a first target setting operation, wherein the first target setting operation comprises setting a target height of the body part with respect to the ground surface and setting a target angle of the body part with respect to the ground surface;

performing a first determination operation of determining, based on the first target setting operation, whether the second side of the connection member of each of the eccentric drive parts is positioned within the rotatable angle by which the second side is rotatable about the first side; and performing a body part posture adjustment operation of adjusting a height of the body part in an upward/downward direction based on determining in the first determination operation that the second side of each of at least some of the connection members of the eccentric drive parts deviates from the rotatable angle by which the second side is rotatable about the first side, wherein the body part posture adjustment operation comprises:

decreasing the height of the body part in the upward/downward direction based on the second side deviating only from an upper boundary, increasing the height of the body part in the upward/downward direction based on the second side deviating only from a lower boundary, and inclining the body part to adjust the height of the body part while inclining the body part so that the body part has a selected body angle with respect to the ground surface based on the second side deviating from both the lower boundary and the upper boundary.

16. The method of claim 15, wherein the body part posture adjustment operation comprises lowering the body part to decrease the height of the body part in the upward/downward direction in a state in which the body part is parallel to the ground surface and in the state in which the second side of the connection member, which is determined as deviating from the upper boundary, is positioned on the upper boundary of the rotatable angle based on determining in the first determination operation that the connection member, which has the second side determined as deviating from the rotatable angle by which the second side is rotatable about the first side, deviates from the upper boundary of two opposite boundaries in the upward/downward direction of the rotatable angle.

17. The method of claim 15, wherein the body part posture adjustment operation comprises raising the body part to increase the height of the body part in the upward/downward direction in a state in which the body part is parallel to the ground surface and in the state in which the second side of the connection member, which is determined as deviating from the lower boundary, is positioned on the lower boundary of the rotatable angle based on determining in the first determination operation that the connection member, which has the second side determined as deviating from the rotatable angle by which the second side is rotatable about the first side, deviates from the lower boundary of two opposite boundaries in the upward/downward direction of the rotatable angle.

18. The method of claim 15, wherein the inclining of the body part to adjust the height of the body part while inclining the body part so that the body part has the selected body angle with respect to the ground surface is based on determining in the first determination operation that the connection members of a first set of the eccentric drive parts deviate from the upper boundary of two opposite boundaries in the upward/downward direction of the rotatable angle and the connection members of a second set of the eccentric drive parts deviate from the lower boundary of the two opposite boundaries in the upward/downward direction of the rotatable angle.

19. The method of claim 18, wherein the inclining of the body part adjusts the height of the body part in a state in which the second side of the connection member, which is determined as deviating from the upper boundary in the first determination operation, is positioned on the upper boundary of the rotatable angle and in the state in which the second side of the connection member, which is determined as deviating from the lower boundary in the first determination operation, is positioned on the lower boundary of the rotatable angle based on determining in the first determination operation that the connection members of a first set of the eccentric drive parts deviate from the upper boundary of the two opposite boundaries in the upward/downward direction of the rotatable angle and the connection members of a second set of the eccentric drive parts deviate from the lower boundary of the two opposite boundaries in the upward/downward direction of the rotatable angle.

20. The method of claim 19, wherein the inclining of the body part derives a derived angle defined between the body part and the ground surface from a relationship formula between a first height of the second side of each of the connection members provided in the movable object, a second height of the body part, and the ground angle defined between the body part and the ground surface and inclines the body part while corresponding to the derived angle.

* * * * *